(12) United States Patent
Khawer et al.

(10) Patent No.: US 7,292,599 B2
(45) Date of Patent: Nov. 6, 2007

(54) METHOD FOR PROVISIONING A PERMANENT VIRTUAL CIRCUIT IN AN ATM NETWORK

(75) Inventors: Mohammad Riaz Khawer, Scotch Plains, NJ (US); Paul Lopreiato, Nutley, NJ (US)

(73) Assignee: Lucent Technologies, Murray Hill, NJ (US)

( * ) Notice: Subject to any disclaimer, the term of this patent is extended or adjusted under 35 U.S.C. 154(b) by 990 days.

(21) Appl. No.: 10/396,773

(22) Filed: Mar. 25, 2003

(65) Prior Publication Data

US 2004/0190520 A1 Sep. 30, 2004

(51) Int. Cl.
*H04L 12/66* (2006.01)
(52) U.S. Cl. .................. 370/463; 370/252; 370/399
(58) Field of Classification Search ............... 370/395, 370/401, 395.1, 463, 252, 399
See application file for complete search history.

(56) References Cited

U.S. PATENT DOCUMENTS

| | | | |
|---|---|---|---|
| 5,872,645 A * | 2/1999 | Proctor ..................... 398/99 |
| 6,356,563 B1 * | 3/2002 | Nicoll et al. ................ 370/466 |
| 6,546,012 B2 * | 4/2003 | Kamo et al. ............ 370/395.1 |
| 6,973,095 B1 * | 12/2005 | Carrel et al. ................ 370/463 |
| 7,158,524 B2 * | 1/2007 | Buyukkoc et al. ....... 370/395.1 |
| 2005/0078691 A1 * | 4/2005 | Davison et al. ............. 370/401 |

* cited by examiner

*Primary Examiner*—Chi Pham
*Assistant Examiner*—Albert T. Chou

(57) ABSTRACT

A permanent virtual circuit (PVC) over an ATM network is provisioned by using a deterministic PVC addressing scheme for computing a unique combination of VPI and VCI values based on certain input parameters associated with the network to which the PVC is logically connected. Specifically, the VPI and VCI of a PVC are deterministically computed as a known function of numerical values of particular network elements associated with the network and the particular PVC being provisioned using a function that enables the values of these network elements to be uniquely determined from the VPI and VCI of the PVC. Thus, once the VPI and VCI are determined for a PVC, the particular network elements associated with that PVC can be unambiguously identified from their values.

9 Claims, 6 Drawing Sheets

METHOD FOR PROVISIONING A PERMANENT VIRTUAL CIRCUIT IN AN ATM NETWORK

TECHNICAL FIELD

This invention relates to Permanent Virtual Circuits (PVCs), and more specifically, to provisioning PVCs in an ATM network.

BACKGROUND OF THE INVENTION

A Permanent Virtual Circuit is a logical data channel on a physical transmission medium, which is running on an ATM protocol stack. A PVC in an ATM network is uniquely identified by the combination of three attributes: 1) a port number, 2) a virtual path identifier (VPI), which is an 8-bit field; and 3) a virtual channel identifier (VCI), which is a 16-bit field. Whereas the port number associated with a PVC has a physical correspondence to the transmission medium (e.g., the specific T1 line among a group of T1 transmission lines that is selected to terminate the PVC), the VPI and VCI used to identify the PVC are logical designations and have no physical correspondence.

In the prior art, each end point of a PVC is provisioned by selecting a VPI and a VCI together with the port number on the physical medium on which the end point terminates. PVCs on an ATM network are used in many different type of network applications. For example, in an exemplary service provider's wireless network shown in FIG. 1, an ATM network 101 serves as the backhaul network interconnecting the Base Station Controllers (BSCs) 102-1-102-N that are supported by a Mobile Switching Center (MSC) 103. MSC 103 is connected to each BSC 102 via a T1 and Ethernet connection 110. Other MSCs, not shown, will be connected to other BSCs, which in turn are connected through the same or through another ATM network to other BTSs. Each BSC 102 connected to MSC 103 is associated with and controls one or more Base Transceiver Stations (BTSs) 104-1-104-M and each BTS is uniquely associated with and is controlled by one of the BSCs. A mobile station 105 subscribing to this provider's wireless services that is communicating with another mobile station on this wireless network or another wireless network or with a station 111 connected to the wire-line Public Switched Telephone Network (PSTN) 112, communicates over an air interface with one of the BTSs 104-1-104-M.

The ATM network 101 includes an ATM edge switch 106 to which the BSCs 102 and MSC 103 are connected and an ATM edge switch 107 to which the BTSs 104 are connected. In this exemplary network, each of the BSCs 102 are connected to switch 106 via between 1 and 8 T1 lines 108, MSC 103 is connected to switch 106 via an OC-3 carrier 113, and each of the BTSs 104 are connected to switch 107 via between 1 and 4 T1 lines 109. Signaling traffic, such as call setup, etc., between a BSC 102 and one of its associated BTSs 104 is carried over a PVC. A PVC which carries signaling traffic is referred to herein as a "signaling PVC." For fault tolerance and redundancy purposes there generally will be two signaling PVCs between each BTS 104 and its associated BSC, a primary signaling link and an alternate signaling link each carried on a separate T1 line. Bearer traffic, such as voice or data call traffic, is carried on a PVC between a BTS 104 and MSC 103, and is associated with a particular one of the BSCs 102. A PVC which carries bearer traffic (voice or data) is referred to herein as a "bearer PVC," also known a ATM Packet Pipe. For this exemplary network, there are up to 12 bearer PVCs between a BTS 104 and MSC 103 that are associated with a particular BSC 102. Each BTS 104 can thus terminate up to 14 PVCs: 2 signaling PVCs and 12 bearer PVCs. These 14 PVCs, numbered from 1 to 14, are provisioned at their BTS-end over the T1 lines 109 connecting their associated BTS with ATM edge switch 107. At the MSC/BSC-end of the PVC, the signaling PVCs among these 14 PVCs, numbered 1 and 2, are provisioned between ATM-edge switch 106 and the associated BSC 102 over T1 lines 108. The 12 bearer PVCs, numbered 3-14, are provisioned between switch 106 and MSC 103 over an OC-3 transmission line 113.

In the prior art, when provisioning either a bearer PVC or a signaling PVC, the service provider arbitrarily selects a VPI and a VCI at each endpoint of each hop of the end-to-end PVC, as well as selects a port number at each endpoint and quality-of-service (QOS) parameters. Generally, the VPI, an 8-bit number, is randomly selected in the range of 0-255, while the VCI, a 16-bit number, is randomly selected in the range of 32-65,535, with 0-31 being reserved by the ATM standards for other purposes. For example, in provisioning a first endpoint of a first hop at BSC 102-1 in a signaling PVC between BSC 102-1 and BTS 104-1, a VPI and VCI are randomly selected for the particular port of BSC 102-1 to which the T1 line that will carry that PVC is connected. Thus, for example, if this PVC will be carried on the T1 line connected to port 1 of BSC 102-1, and VPI=1 and VCI=100 are arbitrarily selected, the endpoint at BSC 102-1 of this PVC, represented by the triplet (VPI, VCI, Port#), is for this example (1,100,1). At the switch side, if that same T1 line is plugged into port 4 of switch 106, then the triplet (1,100,4) represents the switch-side endpoint of that first hop between BSC 102-1 and switch 106, where the VPI and VCI are maintained at the values they have at the BSC-end of the hop. At the other side of the ATM network 101, each end of the hop between edge switch 107 and BTS 104-1 is similarly provisioned. For this hop, the VPI and VCI pair can be selected to be the same or different than the VPI and VCI pair used on the hop between BSC 102-1 and switch 106. For example, this hop of the PVC can be provisioned on the T1 line connected to port 1 of switch 107 with a VPI=2and VCI=100, with the endpoint thus represented as (2,100,1). That T1 line could be connected to port 2 of BTS 104-1, so that the endpoint of that hop at BTS 104-1 is represented by (2,100,2). Once all the endpoints are provisioned, the ATM switch 101 is provisioned to map the endpoint (1,100,4) of the first hop at the BSC side of the switch to the endpoint (2,100,1) at the second hop at the BTS side of the switch in order to ensure end-to-end connectivity of that signaling PVC between BSC 101-1 and BTS 104-1.

Since there are multiple signaling and bearer PVCs connected between each BTS and its associated BSC/MSC, the service provider must separately provision each. With the VPI and VCI values of each hop of each PVC being arbitrarily selected, the service provider needs to accurately record and maintain the VPI, VCI and port numbers of each endpoint for each hop of each PVC in some type of spreadsheet or database lookup table. As a provider's network grows with more base stations being added to increase the provider's coverage area to meet growing demand, thousands of PVCs could easily traverse the provider's ATM backhaul network. Provisioning, managing and maintaining these multitudinous PVCs poses a formidable challenge. Troubleshooting an end-to-end PVC connection through each of its hops is particularly difficult when the endpoints of each hop need be separately identified and traced as the PVC is linked from hop-to-hop.

SUMMARY OF THE INVENTION

In accordance with an embodiment of the invention, a PVC is provisioned by using a deterministic PVC addressing scheme for computing a unique combination of VPI and VCI values based on certain input parameters associated with the network to which the PVC is logically connected. Specifically, the VPI and VCI of a PVC are deterministically computed as a known function of numerical values representing particular network elements associated with the network and the particular PVC being provisioned using a function that enables the values of these network elements to be uniquely backwardly determined from the VPI and VCI of the PVC. Thus, once the VPI and VCI are determined for a PVC, the particular network elements associated with that PVC can be unambiguously identified from their values. Advantageously, the use of this deterministic PVC addressing scheme eliminates the need for maintaining an elaborate spreadsheet for keeping track of the VPI and VCI values for all the PVCs within the ATM network. Further, since the identity of network elements associated with the provisioned PVC can be uniquely retrieved from that PVC's VPI and VCI values by using a deterministic reverse mapping function, trouble shooting can be performed without using a time-consuming database or spreadsheet lookup procedure. Thus, by using standard measurement techniques to determine the VPI and VCI of a traffic-carrying PVC, the network elements associated with that PVC are determined and trouble-shooting of that PVC is readily performed by network technicians.

In a first embodiment, illustrated as being used in an ATM backhaul network for a wireless system, a deterministic mapping scheme provides a 1-to-1 mapping between elements in the universe defined by the entire set of input parameters {an MSC numerical designation (MSC#) representing the particular MSC associated with the PVC, a BSC numerical designation (BSC#) representing the particular BSC associated with the PVC, a BTS numerical designation (BTS#) representing the particular BTS associated with the PVC, and a PVC numerical designation (PVC#)} representing the particular PVC connected between the particular BTS and BSC/MSC, and elements in the universe defined by the set {VPI, VCI}. Specifically, the VPI of a PVC is determined from a predetermined combination selected bits from the binary representation of the MSC# and BSC# values, and the VCI is determined from a predetermined combination of selected bits from the binary representation of BSC#, the BTS# and PVC# values. For each VPI and VCI combination, a reverse mapping uniquely determines the values of the input parameters.

In a second embodiment, decimal values of a set input parameters are used to uniquely map these input parameter values into decimal values of VPI and VCI. As in the first embodiment, the BSC#, BTS# and PVC# values are embedded within the VPI and VCI fields. Rather than using the MSC# as an input parameter, however, an input parameter, Instance#, is used as one of the input parameters in the set of input parameters {Instance#, BSC#, BTS#, PVC#} used to uniquely map the values of these elements to the {VPI, VCI} universe. Instance# indicates how many times the same combination of VPI and VCI values have been used under different MSCs. In this embodiment, reverse mapping of the VPI and VCI decimal values to the decimal values of the associated input parameters advantageously can be performed by observation without executing a reverse mapping program. A technician, therefore, could easily identify which network elements are associated with a particular PVC that has given VPI and VCI values.

DETAILED DESCRIPTION

Figure 1:
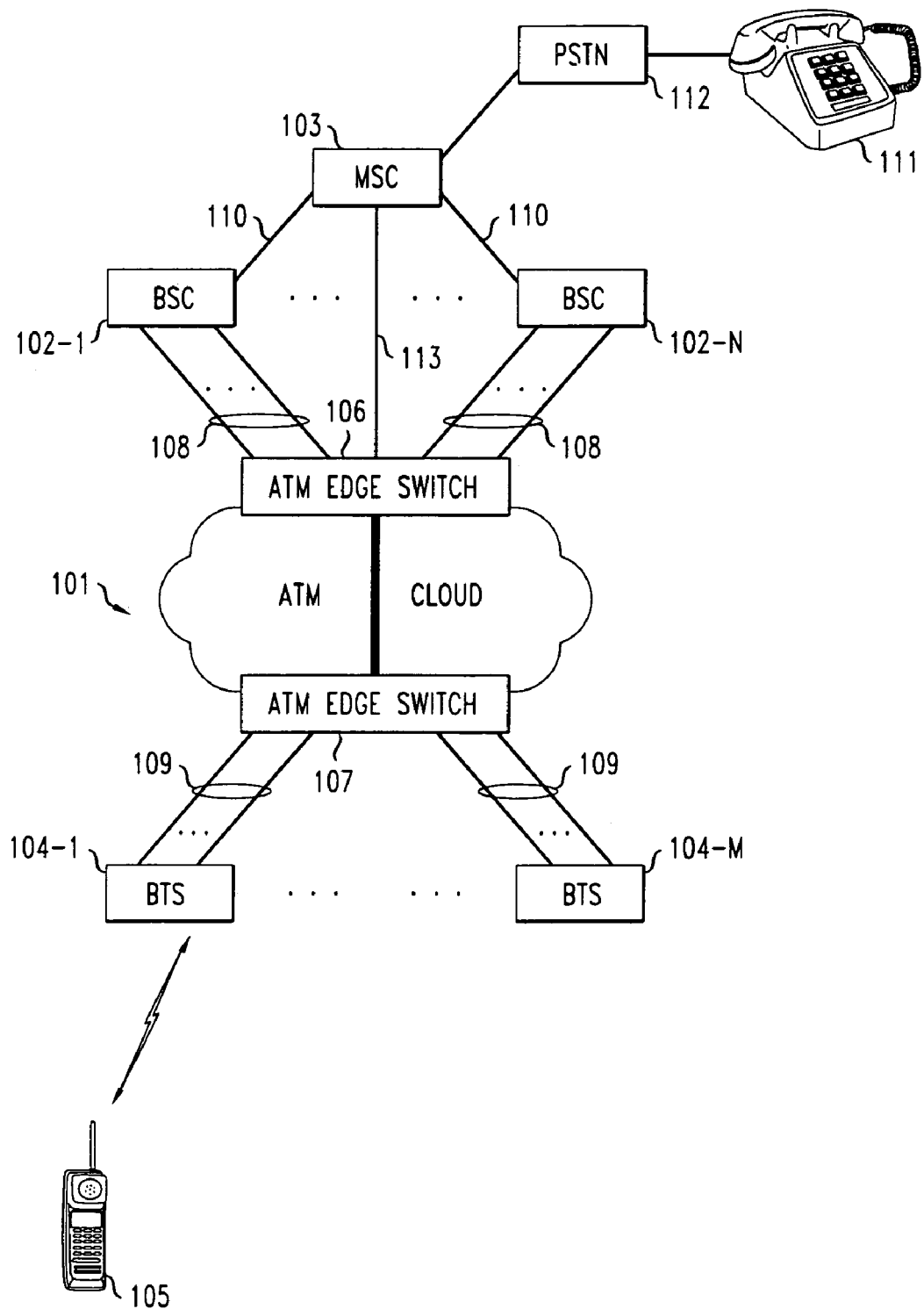
FIG. 1 is a block diagram of a prior art ATM back haul network in a wireless system over which PVCs are provisioned, as described above.

In the first embodiment of the invention, the values of the elements in the set of input parameters {MSC#, BSC#, BTS#, PVC#} are used to compute a 1-to-1 mapping to the values of the elements in the set defined by {VPI, VCI}. As previously noted, VPI is an 8-bit field with allowed values ranging from {1-255} and VCI is a 16-bit field with allowed values ranging from {32-65535}. In creating a mapping scheme between the set of input parameters and the elements in the set {VPI, VCI}, a range of possible values of the input parameters to be supported is specified. Specifically, for this embodiment, the range of values of MSC# is limited to be {1-63}, the range of values of BSC# is limited to be {1-1023}, the range of values of BTS# is limited to {1-15}, and the range of values of PVC# is limited to {1-14}. The maximum in latter range, as noted above, is total number of PVCs being connected between either a BSC 102 or MSC 103 and its associated BTS 104 in the exemplary prior art network of FIG. 1.

Figure 2:
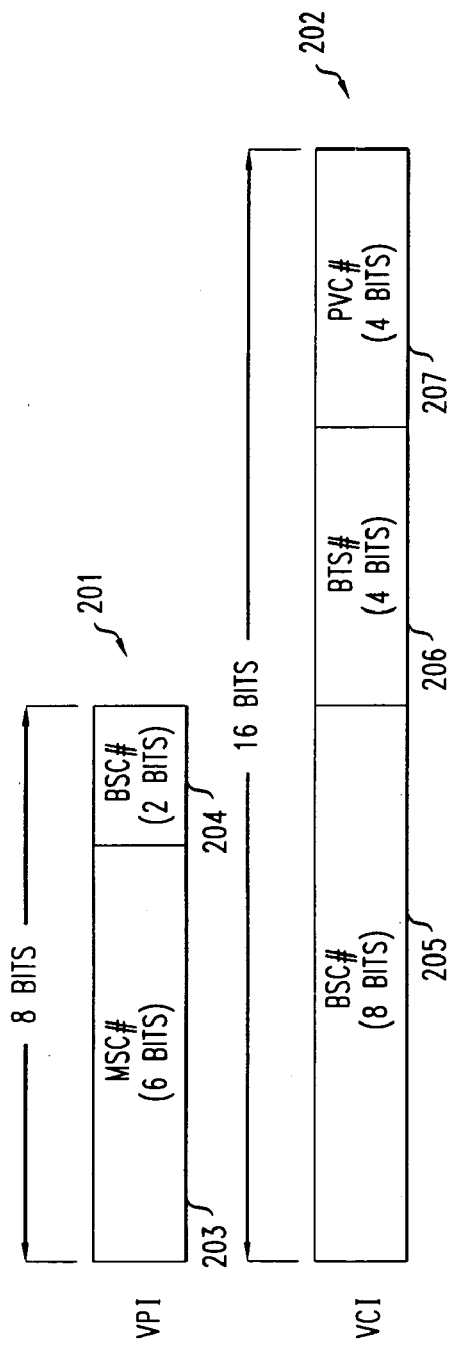
FIG. 2 shows a first embodiment of a deterministic PVC addressing scheme in accordance with the invention.

In order to support these ranges, 6 bits are needed to specify the MSC#, 10 bits are needed to support the BSC#, 4 bits are needed to support the BTS#, and 4 bits are needed to support the PVC#. A total of 24 bits are thus needed to support all these input parameters. These 24 bits are spread across the 8-bit VPI field 201 and 16-bit VCI field 202 in the manner shown in FIG. 2. The 6-bit MSC# having a valid decimal range {1-63} is embedded within the most significant 6-bit portion 203 (bits $B_8$-$B_3$) of the 8-bit VPI field 201. The 10-bit BSC# having a valid decimal range {1-1023} is divided between the least significant 2-bit portion 204 of the VPI field 201 and the most significant 8-bit portion 205 of the VCI field 202. Specifically, the most significant 2 bits of the 10-bit BSC# field is embedded within the least significant 2 bits (bits $B_2$-$B_1$) of the 8-bit VPI field and the least significant 8 bits of the BSC# field is embedded within the most significant 8 bits (bits $B_{16}$-$B_9$) of the 16-bit VCI field. The 4-bit BTS# having a valid decimal range {1-15} is embedded within the 16-bit VCI field 202 in the portion 206 that encompasses bits $B_8$-$B_5$. The remaining input parameter, the 4-bit PVC# having a valid decimal range {1-15} is embedded within the least significant 4-bit portion 207 of the VCI field in bits $B_4$-$B_1$. With this arrangement, for MSC#=1, BSC#=1, BTS#=1, and PVC#=1, the minimum binary VPI is "00000100", equivalent to a decimal 4, and the minimum binary VCI is "0000000100010001", equivalent to a decimal 273, which is greater than the allowed minimum range value of 32 required by the ATM standards.

Figure 3:
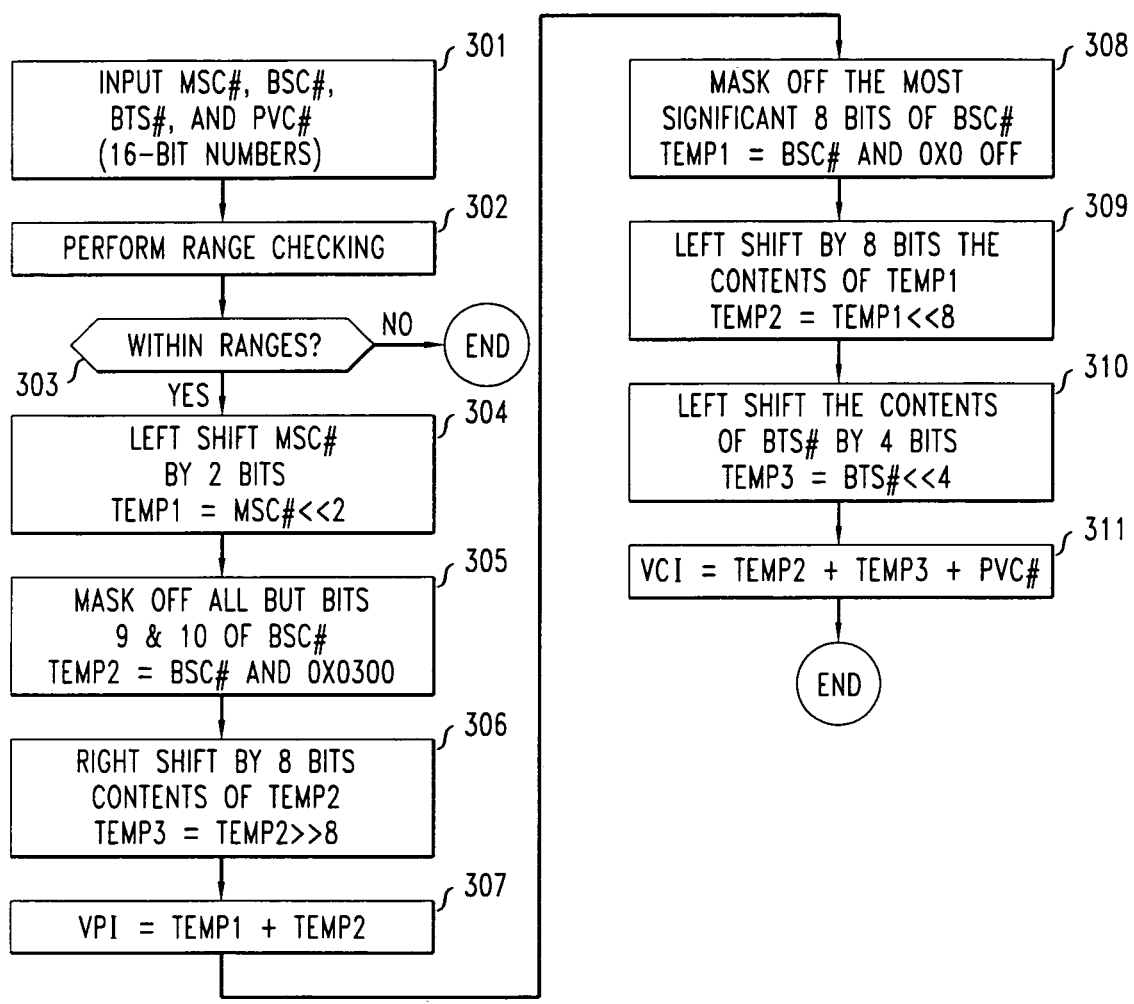
FIG. 3 is a flowchart of the steps of the forward mapping scheme of FIG. 2 that is used to determine the VPI and VCI values from the set of input parameter values.

The flowchart in FIG. 3 shows the steps of converting the input parameter values MSC#, BSC#, BTS# and PVC# into the 8-bit VPI field and 16-bit VCI field. At step 301, the MSC#, the BSC#, the BTS# and PVC# values are inputted as 16-bit binary numbers. At step 302, a range check is performed on each value to ascertain that each is within its valid range as specified above. If, at step 303, a determination is made that one or more of the input parameter values are outside its allowed range, then the process ends. If, however, each of the input parameter values is within its allowed range, then the process continues. At step 304, the binary MSC# value is left-shifted by 2 bits to form a first temporary parameter, temp1, in which all the significant bits of MSC# are in the $3^{rd}$ through $8^{th}$ bit positions and all other bits are "0". At step 305, except for the $9^{th}$ and $10^{th}$ bits, all bits of the binary BSC# value are masked off by forming an AND combination between the binary BSC# value and 0X0300 (0000 00110000 0000). The resultant temporary parameter, temp2, thus contains the 2 most significant bits of the 10-bit BSC# value in its $9^{th}$ and $10^{th}$ bit positions, and "0"s in all other bit positions. At step 306, temp2 is right-shifted by 8 bits, thereby moving the $9^{th}$ and $10^{th}$ bits of temp2 into the $1^{st}$ and $2^{nd}$ bit positions of a third temporary parameter, temp3, with "0"s in all other bit positions. At step 307, temp1 and temp 3 are added together to form the VPI field that contains the binary MSC# value in its $3^{rd}$ through $8^{th}$ bit positions and the two most significant bits of the binary BSC# value in its $1^{st}$ and $2^{nd}$ bit positions. After the VPI field is formed, the VCI field is formed by first, at step 308, masking off the most significant 8 bits of the 16-bit input BSC# value. This is done by forming the AND combination of that 16-bit BSC# and 0X00FF (0000 0000 1111 1111) to form a 16-bit temporary parameter, temp1, that contains the 8 least significant bits of the binary BSC# value in its 8 least significant bit positions and "0"s elsewhere. At step 309, the 16-bit temp1 is left-shifted by 8 bits, to form a temporary parameter, temp2, that contains the 8 least significant bits of the binary BSC# value in its 8 most significant bit positions and "0"s elsewhere. At step 310, the value of the 16-bit input parameter BTS#, which due to the allowed range of BTS# has significant bits in only the $1^{st}$ through $4^{th}$ bit positions, is left shifted by 4 bits. The resultant temporary parameter, temp3, thus contains those four significant bits in its $5^{th}$ through $8^{th}$ bit positions and "0"s elsewhere. At step 311, the 16-bit VCI field is formed by adding the binary temp2, the binary temp3, and the binary PVC# value together, the latter already having significant bits only in its $1^{st}$ through $4^{th}$ bit positions.

Figure 4:
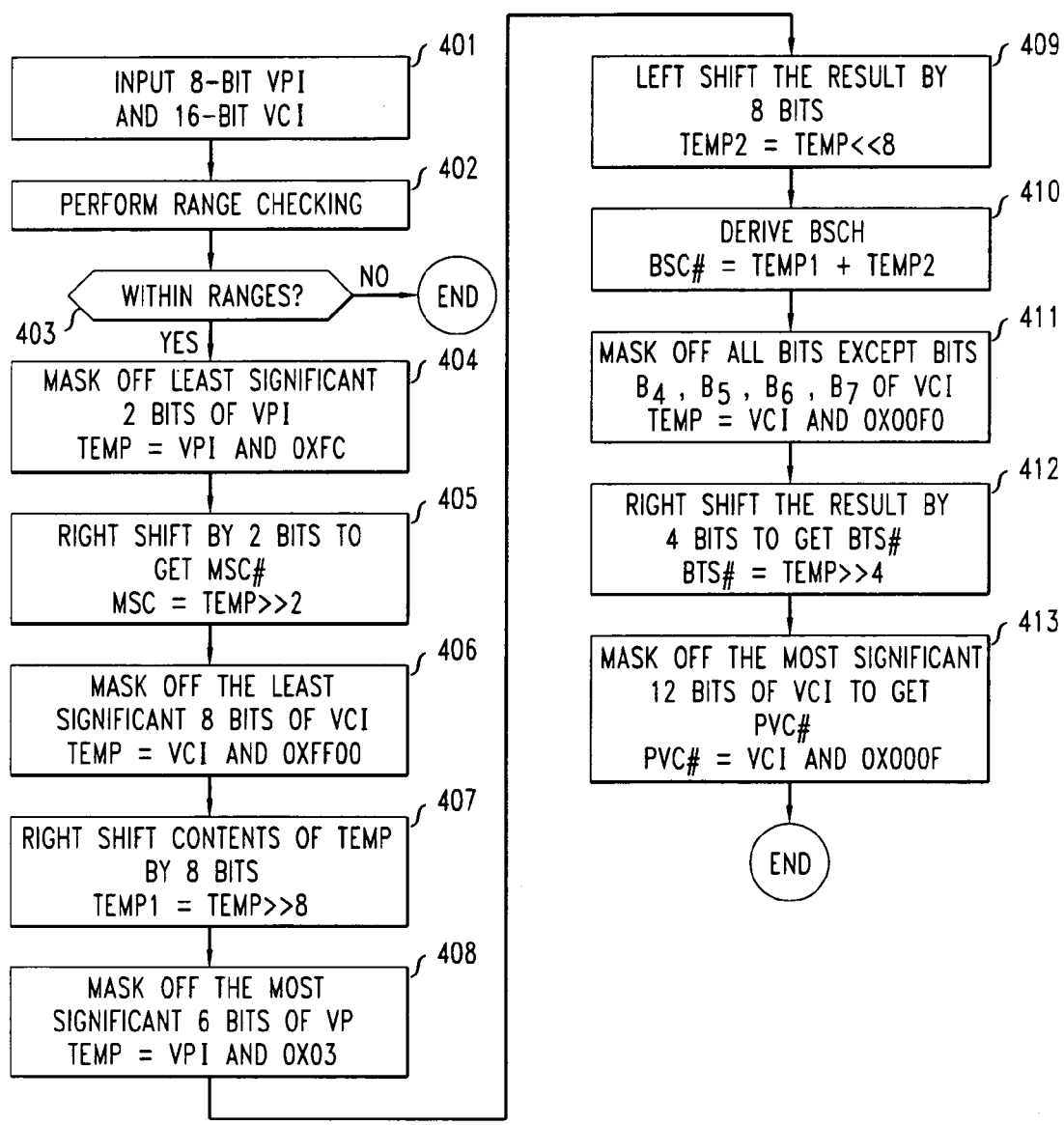
FIG. 4 is a flowchart of the steps of the reverse mapping scheme associated with the forward mapping scheme in FIG. 3 that is used to uniquely map the VPI and VCI values of a PVC into the corresponding set of input parameter values.

As previously discussed, a reverse mapping will map values in the set {VPI, VCI} into the input parameter values {MSC#, BSC#, BTS#, PVC#}. The flowchart in FIG. 4 details the steps of mapping the VPI and VCI values of a PVC to the corresponding set of input parameter values. At step 401, the 8-bit binary VPI and 16-bit binary VCI are inputted. At step 402, the decimal equivalents of the VPI and VCI values are checked to determine that each is within its allowed range. As noted above, the minimum decimal VPI value 4 so that a valid VPI value must be within the range {4-255}. Similarly, as noted above, the minimum decimal VCI value is 273 so that a valid VCI value must be within the range {273-65535}. At step 403, if either the VPI or VCI values are outside its allowed range, then the reverse mapping process is halted. If the VPI and VCI values are each within its allowed range, the reverse mapping proceeds. At step 404, the least significant 2 bits of VPI are masked off to form a temporary parameter, temp, by forming an AND combination of the 8-bit VPI and 0XFC (1111 1100). At step 405, temp is right shifted by 2 bits to yield the 6-bit binary MSC# value. At step 406, the least significant 8 bits of the 16-bit VCI value are masked off by forming an AND combination of VCI and 0XFF00 (1111 1111 0000 0000) to form a 16-bit temporay parameter, temp, having "0"s in its last 8 bit positions. At step 407, the contents of the resultant temp parameter are then right-shifted by 8 bits to form a 16-bit temporary parameter, temp1, containing in its least significant 8 bit positions the 8 most significant bits of the VCI value. At step 408, the most significant 6 bits of the 8-bit VPI value are masked off by forming the AND combination of VPI and 0X03 (0000 0011). This yields a temporary parameter, temp, that has in its least significant 2 bit positions the 2 least significant bits of the VPI value and "0"s elsewhere. These 2 least significant bits of VPI (204) are the 2 most significant bits of the binary BSC# value. At step 409, temp is left shifted by 8 bits yielding a 10-bit parameter, temp2, that has in its 2 most significant bits the 2 most significant bits of the binary BSC# value and "0"s elsewhere. At step 410, the 10-bit binary BSC# value is formed by combining the 10-bit temporary parameter temp1 with the 10-bit temporary parameter temp2. At step 411, another 16-bit temporary parameter, temp, is formed by masking all but bits $B_7$,$B_6$,$B_5$, and $B_4$ (206) of the VCI value by forming the AND combination of the binary VCI and 0X00F0 (0000 0000 1111 0000). At step 412, the 16-bit temp is right shifted by 4 bits to yield the binary BTS# value in the resultant least significant 4 bit positions. At step 413, the most significant 12 bits of the VCI value are masked off by forming the AND combination of the binary VCI and 0X000F (0000 0000 0000 1111). The least significant 4 bits of the resultant combination contain the binary PVC# value. All the input parameters are now determined from the combination of VPI and VCI.

As examples, it can be readily shown that decimal values of MSC#=1, BSC#=1, BTS#=1 and PVC#=1 yield values of VPI=4 and VCI=273; that decimal values of MSC#=5, BSC#=80, BTS=2, and PVC#=3 yield values of VPI=20 and VCI=20515; and that decimal values of MSC#=5, BSC#=261. BTS#=1 and PVC#=2 yield values of VPI=21 and VCI=1298.

In a second illustrative embodiment, element values in the universe defined by the subset of inputs parameters {BSC#, BTS#, PVC#} are 1-to-1 mapped to element values in the universe defined by the set {VPI, VCI}. Rather than using the MSC# as used in the first described embodiment above, the scheme in this second embodiment uses instead as an input parameter a parameter called "Instance#", which indicates how many times the same combination of VPI and VCI values have been used under different MSCs. This enables a service provider to reconfigure its network by moving control of a BSC from one MSC to another without needing to change the VPI and VCI values of all of its associated PVCs. In this embodiment, rather than the binary representations of the input parameter values being embedded in the 8-bit and 16-bit binary representations of the VPI and VCI values, respectively, the decimal representation of the input parameter values are embedded in the decimal representations of the VPI and VCI values. Advantageously, with this embodiment, the VPI and VCI values can be easily reverse-mapped into the input parameter values through observation without a reverse mapping program.

Figure 5:
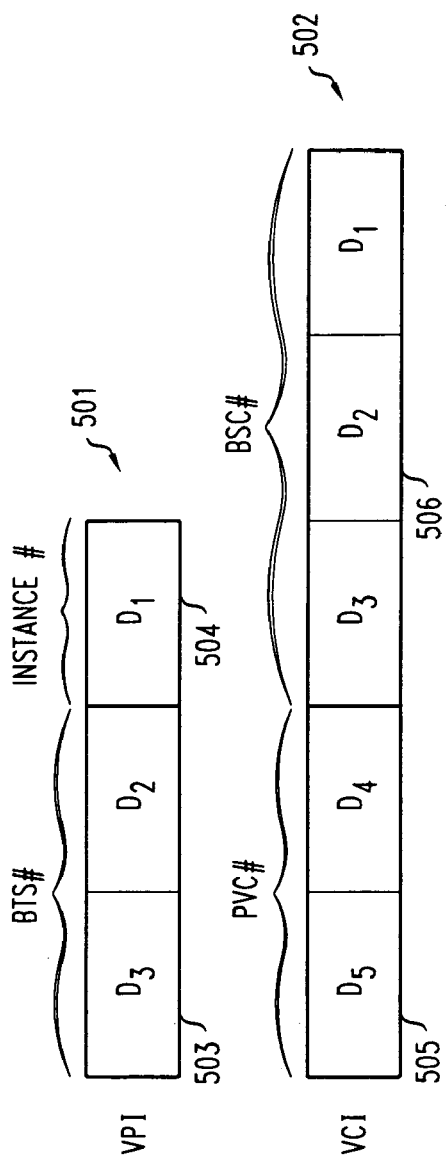
FIG. 5 shows a second embodiment of a deterministic PVC addressing scheme in accordance with the invention.

FIG. 5 shows the mapping between the set of input parameters {Instance#, BSC#, BTS#, PVC#,} and the 3-digit decimal VPI field 501 and 5-digit decimal VCI field 502, the length of these fields being determined by the above noted permissible decimal range of VPI as {1-255} and the permissible decimal range of VCI as {32-65535}. In accordance with this mapping, the 2-digit decimal BTS# value is mapped into the most significant 2-digit region 503 containing digits $D_3$ and $D_2$ of the 3-digit VPI field and a one-digit decimal value of the Instance# value is mapped into the least significant digit $D_1$ 504 of the 3-digit VPI field. The permissible decimal range of Instance# value for this embodiment is therefore limited to {0-9}. Since the maximum decimal value of VPI is 255, the permissible range of BTS# is limited to {1-24} in order to insure that the maximum decimal VPI value is not exceeded for all possible allowed values of Instance#. For these input parameter value ranges, the permissible range of VPI is {10-249}. For VCI, the decimal value of PVC# is mapped into the most significant 2-digit region 505 containing digits $D_5$ and $D_4$ of the 5-digit VCI field and the decimal value of BSC# is mapped into the least significant 3-digit region 506 containing digits $D_3$, $D_2$ and $D_1$ of the VCI field. The permissible range of the BSC# value is {1-999). Since the maximum decimal value of VCI is 65,535, the permissible range of the PVC# value is {1-64} in order to insure that maximum value of VCI is not exceeded for all possible values of BSC#. With these input parameter value ranges, the permissible range of the value of VCI is {1001-64,999}.

Figure 6:
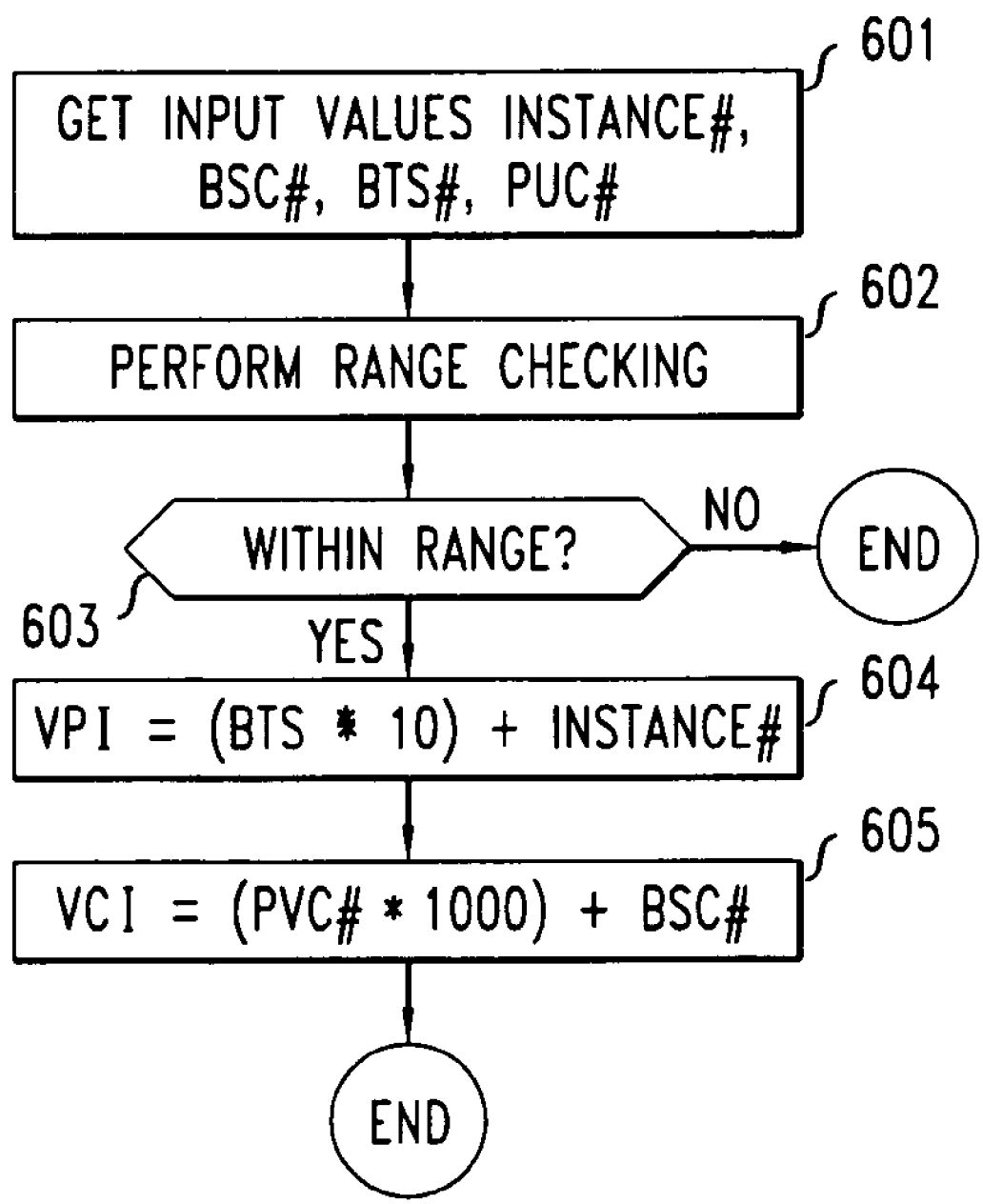
FIG. 6 is a flowchart of the steps of the forward mapping scheme of FIG. 5 that is used to determine the VPI and VCI values from the set of input parameter values.

The flowchart in FIG. 6 details the steps of performing a forward mapping of the decimal values of the input parameters {Instance#, BSC#, BTS#, PVC#} to the decimal values {VPI, VCI}. At step 601, the decimal values of the input parameters are received. At step 602, a range check on each input parameter value is performed. Thus, the value of each input parameter is compared with its permissible range that is defined above. At step 603, a determination is made whether each of the input parameters is within its permissible range. If one or more values are not, then the process ends. If the value of each of the input parameters is within its range, then the process proceeds. At step 604, the decimal value of VPI is calculated by multiplying the decimal BTS# value by 10 and adding the value of Instance#. At step 605, the decimal value of VCI is calculated by multiplying the decimal PVC# value by 1000 and adding the value of BSC#. The forward mapping of input parameter values to VPI and VCI values is now complete.

As example, for it can readily be seen that decimal values of BSC#=261, BTS#=1, PVC=1, and instance#=0 yield values of VPI=10 and VCI=1261, that decimal values of BSC#=261, BTS#=1, PVC#=2, and Instance#=0 yield values of VPI=10 and VCI=2261, and that decimal values of BSC#=261, BTS#=1, PVC#=3 and Instance#=0 yield values of VPI=10 and VCI=3261.

Figure 7:
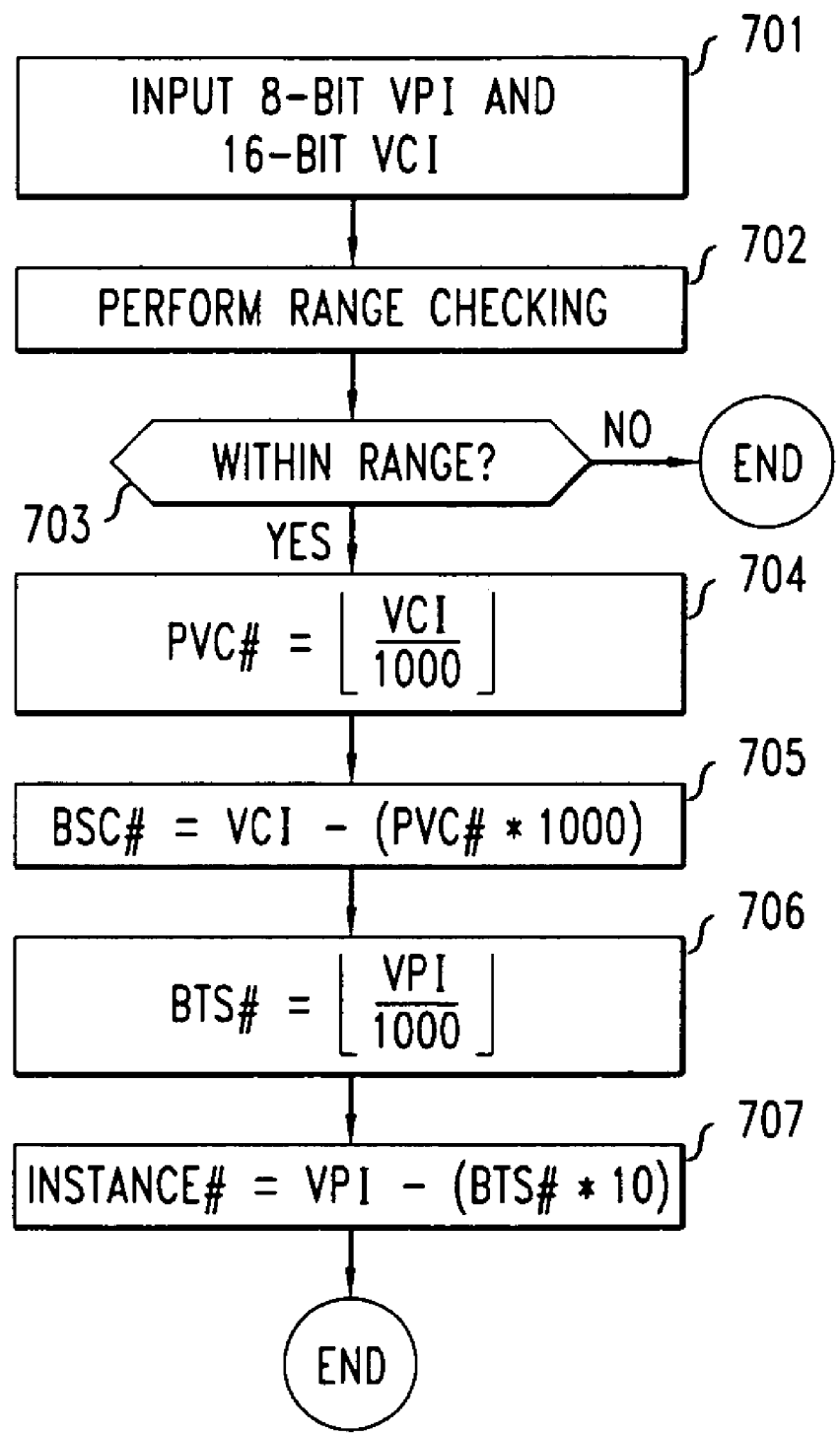
FIG. 7 is a flowchart of the reverse mapping scheme associated with the forward mapping scheme in FIG. 6 that is used to uniquely map the VPI and VCI values of a PVC into the corresponding set of input parameter values.

Reverse mapping from the set {VPI, VCI} values to the set of input parameter values {Instance#, BSC#, BTS#, PVC#} is readily performed. The flowchart in FIG. 7 shows this reverse mapping. At step 701, the 8-bit binary VPI value and 16-bit VCI value are received and converted to decimal numbers. At step 702, range checking of each value is performed. Thus, for this embodiment, a determination is made whether VPI is in the range {10-249} and whether VCI is in the range {1001-64999}. If, at step 703, a determination is made that the value of either one or both of VPI and VCI are outside their range, then the process ends. If the values of both VPI and VCI are within their allowed ranges, then, at step 704, the value of PVC# is determined to be the floor of VCI/1000. At step 705, the value of BSC# is calculated as the difference between VCI and PVC#× 1000. At step 706, the value of BTS# is determined as the floor of VPI/10. Finally, at step 707, the value of Instance# is calculated as the difference between VPI and BTS#×10.

As can be seen, the reverse mapping from the values in the set {VPI, VCI} to the values of the input parameters in the set (Instance#, BSC#, BTS#, PVC#} can be readily performed with this embodiment. For example, for a VPI=10 and VCI=1261, it is apparent that the decimal values of the input parameters are: BSC#=261, BTS#=1, PVC#=1 and Instance#=0.

The VPI and VCI can be determined from the values of the input parameters associated with the network by means of a program running locally on a standalone PC, a PDA, or any other type of general or special purpose device. Alternatively, the program can be accessed through a browser via a wired or wireless device at a Web site on the Internet or a server on an Intranet. Reverse mapping of the values of the input parameters from the values of VPI and VCI can similarly be performed using a program running locally on a PC, a PDA, or any other type of general or special purpose device, or a program accessed at a Web site on the Internet or at a server on an Intranet through a browser via a wired or wireless device. Whereas the forward mapping program will be used in provisioning a PVC, the reverse mapping program will be used for maintenance and troubleshooting purposes.

Although the described embodiments relate to the provisioning of a PVC within a wireless ATM backhaul network, other embodiments of the invention could be used to provision a PVC in any type of ATM network. Further, other functions could be devised for creating a one-to-one relationship between numerical values associated with selected network elements associated with a PVC and that PVC's VPI and VCI.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

The invention claimed is:

1. A method of provisioning a permanent virtual circuit (PVC) in an ATM network having associated network elements, the method comprising:

deterministically computing a virtual path identifier (VPI) and a virtual channel identifier (VCI) for the PVC as a known function of numerical values associated with one or more particular ones of the network elements, wherein the numerical values associated with the particular network elements are uniquely backwardly determinable from the VPI and VCI of the PVC; and outputting the VPI and the VCI for the PVC.

2. The method of claim 1 wherein binary values associated with the particular network elements are embedded in the VPI and VCI in predetermined bit positions.

3. The method of claim 1 wherein decimal values associated with the particular network elements are embedded in the VPI and VCI in predetermined decimal positions, the decimal values associated with the selected network elements being visually determinable from the decimal values of the VPI and VCI.

4. An ATM network having associated network elements, the ATM network comprising:

a permanent virtual circuit (PVC) including a virtual path identifier (VPI) and a virtual channel identifier (VCI) deterministically computed as a known function of numerical values associated with one or more particular ones of the network elements, wherein the numerical values associated with the particular network elements are uniquely backwardly determinable from the VPI and VCI of the PVC.

5. The ATM network of claim 4, wherein binary values associated with the particular network elements are embedded in the VPI and VCI in predetermined bit positions.

6. The ATM network of claim 4, wherein decimal values associated with the particular network elements are embedded in the VPI and VCI in predetermined decimal positions, the decimal values associated with the selected network elements being visually determinable from the decimal values of the VPI and VCI.

7. A computer readable media tangibly embodying a program of instructions executable by a computer to perform a method for determining a virtual path identifier (VPI) and a virtual channel identifier (VCI) for a permanent virtual circuit (PVC) in an ATM network having associated network elements, the method comprising:

deterministically computing the VPI and the VCI as a known function of numerical values associated with one or more particular ones of the network elements, wherein the numerical values associated with the particular network elements are uniquely backwardly determinable from the VPI and VCI of the PVC; and outputting the VPI and the VCI for the PVC.

8. The media of claim 7 wherein in the method the VPI and VCI are computed by embedding binary values associated with the particular network elements in predetermined bit positions of the VPI and VCI.

9. The media of claim 7 wherein in the method the VPI and VCI are computed by embedding decimal values associated with the particular network elements decimal values in predetermined decimal positions of the VPI and VCI.

* * * * *